United States Patent [19]

Burkard et al.

[11] Patent Number: 4,564,544
[45] Date of Patent: Jan. 14, 1986

[54] FIRE-RESISTANT GYPSUM BOARD

[75] Inventors: Edward A. Burkard, East Amherst; James J. Segada, North Tonawanda, both of N.Y.

[73] Assignee: National Gypsum Company, Dallas, Tex.

[21] Appl. No.: 556,969

[22] Filed: Dec. 1, 1983

[51] Int. Cl.$^4$ .......................... B32B 1/04; B32B 5/18; B32B 13/04; B32B 31/00
[52] U.S. Cl. .................................... 428/70; 428/703; 428/537.1; 428/920; 428/921
[58] Field of Search ................. 428/703, 70, 920, 921, 428/537

[56] References Cited

U.S. PATENT DOCUMENTS

| | | | |
|---|---|---|---|
| 2,136,877 | 11/1938 | Delpech et al. | 428/920 X |
| 2,970,127 | 1/1961 | Slayter et al. | 428/703 X |
| 3,189,511 | 6/1965 | White | 428/703 X |
| 3,376,147 | 2/1968 | Dean | 428/703 X |
| 4,238,546 | 12/1980 | Phillips | 428/703 X |
| 4,403,006 | 9/1983 | Bruce et al. | 428/703 X |

*Primary Examiner*—George F. Lesmes
*Assistant Examiner*—Nancy A. Swisher
*Attorney, Agent, or Firm*—Robert F. Hause

[57] ABSTRACT

A fire-retardant gypsum wallboard having, in the gypsum core, about 2% by weight of a feldspar-free muscovite, in combination with other minor additives including ½ inch long glass fibers.

2 Claims, No Drawings

FIRE-RESISTANT GYPSUM BOARD

BACKGROUND OF THE INVENTION

1. Field of the Invention

This invention relates to paper-faced gypsum wallboards having a special core formulation with ingredients intended to aid in maintaining the board integrity when subjected to fire.

2. Description of the Prior Art

U.S. Pat. No. 1,778,008 discloses using pieces of mica or exfoliated zonolite in gypsum board, to make the board light, strong and inexpensive, and states that if the particles are all larger than 16 mesh, the mica will not detract from the strength of the finished product. Particles of up to about one inch in size are recommended, so that they can interlock with one another.

U.S. Pat. No. 2,198,885 discloses the use of granular highly porous calcium silicate, and describes a prior use of expanded flakes of mica, which, while comparatively light in weight and fire-proof, did not possess good internal strength and did not bond to gypsum.

U.S. Pat. Nos. 2,526,066; 2,744,022; 3,376,147; 3,454,456 and 3,616,173 all relate to the use of unexpanded vermiculite, which is a form of mica, in a gypsum wallboard core since it is capable of expanding at high temperature and thus counteracting the tendency of the gypsum in the core to shrink at high temperature, as in a fire.

SUMMARY OF THE INVENTION

In accordance with the present invention, feldspar-free muscovite is added to the core of a gypsum wallboard to improve the fire resistance of the wallboard, at a rate of from 2% by weight of the entire core.

DESCRIPTION OF THE PREFERRED EMBODIMENTS

A gypsum wallboard is produced in accordance with the invention by mixing the ingredients of the settable aqueous slurry that forms the gypsum core of gypsum wallboard, disposing the settable slurry between two opposed paper face sheets, forming the slurry and face sheets into thin board form, allowing the composite product to harden by a setting of the gypsum, and drying the product. The slurry ingredients include, specifically, about 2% by weight feldspar-free muscovite, based on the finished dry weight of the gypsum core.

A gypsum wallboard formulated to provide extra fire retardance was provided by using a core formulation, for 1000 sq. ft. of ½ inch board, generally as follows:

|  | Weight | Percentage |
| --- | --- | --- |
| Calcined Gypsum Stucco | 1640 lbs | 84.6 |
| Set Accelerator | 5 lbs | 0.25 |
| Feldspar-Free Muscovite | 30 lbs | 1.6 |
| Wet Chopped Glass Fiber | 5 lbs | 0.25 |
| Starch | 8 lbs | 0.4 |
| Water for Rehydration | 245 lbs | 12.65 |
| Foaming Agent, Water Reducing Agents, etc. | 5 lbs | 0.25 |
|  | 1938 lbs | 100.00 |

Thus, after combining the stucco and the water, it will be seen that a wallboard core is provided which contains about 97% set gypsum and about 2% feldspar-free muscovite.

The use of additional amounts of water will be necessary to provide the necessary fluidity of the mix for forming the above formulation into one thousand square feet of wallboard, using 120 lbs of paper for the two paper faces, which additional water is removed in a dryer following hydration of the core. An improved wallboard, of 2060 lbs/M Sq. Ft., is thus provided.

Muscovite is one of several members of the mica group, which all contain . . . (AlSi$_3$O$_{10}$) . . . , others of the group being phlogopite, biotite, lepidolite and margarite. Muscovite is described as KAl$_2$(AlSi$_3$O$_{10}$)(OH)$_2$. The mica group, along with the serpentine group, the clay mineral group and the chlorite group, are all phyllosilicates . . . (Si$_2$O$_5$) . . . , which, with five other classes, make up what are broadly termed silicates. Vermiculite, which is a mineral which has also been used in gypsum wallboard, is a form of biotite. Biotite is described as either KM$_g$(AlSi$_3$O$_{10}$)(OH$_2$) or KFe(AlSi$_3$O$_{10}$)(OH)$_2$.

Feldspar is a group of silicates, one of the tectosilicates (SiO$_2$) and includes K-feldspars KAlSi$_3$O$_8$, plagioclase feldspars NaAlSi$_3$O$_8$ and danburite CaB$_2$Si$_2$O$_8$.

The feldspar-free muscovite is available from Harris Mining Co. of Spruce Pine, N.C., and is identified as their grade P-80K Tuesday mica. Chemically, the muscovite is defined as KAl$_2$(AlSi$_3$O$_{10}$)(OH)$_2$. A maximum of 1.5% may be retained on a 100 mesh screen, but it must pass a 60 mesh screen. Up to 10% may be retained on a 200 mesh screen but at least 50% must pass through a 325 mesh screen. The density of the muscovite is between 11 and 16 lbs/cubic foot. The Harris Mining Co. also sells a P-80K muscovite, not identified by the designation Tuesday, which contains substantial quantities of feldspar, which does not function as well in controlling shrinkage, when embodied in a gypsum wallboard core.

The calcined gypsum stucco is approximately 90% pure CaSO$_4$.½H$_2$O of a fineness such that about 93% passes through a 100 mesh screen. The composition of a suitable set accelerator is described in U.S. Pat. No. 3,870,538. The wet chopped glass fibers used were a PPG Industries ½ inch long fiber having a diameter of about $60 \times 10^{-5}$ inch. Starches, foaming agents and water reducing agents are all well known in the art.

This improved wallboard has been found to have a shrinkage, when subjected to 1600° F., which is 20% less than the shrinkage of a comparable wallboard having no muscovite. To provide a 20% reduction in shrinkage using unexpanded vermiculite, instead of muscovite, in the above formula, it has been found necessary to use at least 40 lbs of a #4 grade unexpanded vermiculite. Thus, a 25% reduction in the shrinkage reducing agent required is provided when the novel feldspar-free muscovite is substituted for the commonly used unexpanded vermiculite.

When tested according to a slightly modified ASTM-119 floor-ceiling fire test, modified in that a used floor slab is employed to provide economies in testing without affecting comparative test results, the ½ inch wallboard of the invention passed the 2-hour test with considerable time to spare, whereas a comparable wallboard having 40 pounds of unexpanded vermiculite replacing the 30 pounds of muscovite failed the same modified 2-hour test by a considerable amount of time. A still further comparable wallboard having 40 pounds of unexpanded vermiculite and with the fiber glass increased from about 5 pounds up to about 6¾ pounds did pass the 2-hour fire test. Thus, a comparison demonstrating the unexpected improvements provided by the invention can be summarized as follows:

| Glass | Additive | 2 Hr. Fire Test |
|---|---|---|
| 6.75 #/MSF | 40# Vermiculite | Exceeded |
| 5.1 #/MSF | 40# Vermiculite | Failed |
| 5.1 #/MSF | 30# Feldspar-Free Muscovite | Exceeded |

In summary, the present limited testing has proven that the invention permits replacement of the vermiculite of prior fire-rated gypsum wallboards with only 75% of the quantity of feldspar-free muscovite, and simultaneously reduce the required glass fiber content by 25%.

Having completed a detailed disclosure of the preferred embodiment of our invention so that those skilled in the art may practice the same, we contemplate that variations may be made without departing from the essence of the invention or the scope of the appended claims.

We claim:

1. A gypsum wallboard comprising a set gypsum core and two opposed paper faces, said core comprising, as a major portion, set gypsum, and in minor portions muscovite and short glass fibers, said muscovite being substantially free of feldspar wherein substantially all of said muscovite will pass a 60 mesh screen, said core further comprising minor portions of a set accelerator, starch and foaming agent.

2. A gypsum wallboard as defined by claim 1 wherein said core comprises about 97% set gypsum and about 2% feldspar-free muscovite.

* * * * *